United States Patent [19]

Shinoda

[11] Patent Number: 4,935,913
[45] Date of Patent: Jun. 19, 1990

[54] OPTICAL INFORMATION RECORDING AND REPRODUCING APPARATUS

[75] Inventor: Masahisa Shinoda, Kyoto, Japan

[73] Assignee: Mitsubishi Denki Kabushiki Kaisha, Japan

[21] Appl. No.: 178,357

[22] Filed: Apr. 6, 1988

[30] Foreign Application Priority Data

Apr. 7, 1987 [JP] Japan .................................. 62-83860
Apr. 8, 1987 [JP] Japan .................................. 62-83861
Jun. 2, 1987 [JP] Japan .................................. 62-137795
Dec. 28, 1987 [JP] Japan .................................. 62-329942

[51] Int. Cl.$^5$ .................... G11B 21/12; G11B 3/82; G11B 7/00
[52] U.S. Cl. .................................. 369/54; 369/32; 369/44.11; 369/109; 369/122
[58] Field of Search ................... 369/32, 44, 45, 54, 369/112, 116, 122, 109

[56] References Cited

U.S. PATENT DOCUMENTS

| | | | |
|---|---|---|---|
| 4,298,974 | 11/1981 | Tsunoda et al. | 369/45 |
| 4,546,463 | 10/1985 | Opheij et al. | 369/110 |
| 4,547,872 | 10/1985 | Henmi et al. | 369/45 |
| 4,712,207 | 12/1987 | Reno | 369/112 |
| 4,754,446 | 6/1988 | Reno | 369/112 |

FOREIGN PATENT DOCUMENTS 57-191841 11/1982 Japan .................................. 369/110
59-71142 4/1984 Japan .................................. 369/120

OTHER PUBLICATIONS

Hamada et al, "Two-Beam Optical Head" SPIE vol. 695, Optical Mass Storage II (1986), pp. 182-186.
"Principles of Optical Disc Systems", Adam Hilger Ltd. pp. 260-267.

Primary Examiner—Steven L. Stephan
Attorney, Agent, or Firm—Leydig, Voit & Mayer

[57] ABSTRACT

An optical information recording and reproducing apparatus which radiates a plurality of beams onto an information recording medium to optically record information on the medium as well as reproduce the information just recorded. The apparatus includes a beam generator for radiating a plurality of beams of the same wavelength; an optical system for radiating the plurality of beams onto the information recording medium in such a manner that spots formed by the beams are arranged in the direction in which the information is being recorded, and for extracting the plurality of beams reflected by the information recording medium; and an optical detector for detecting each of the plurality of beams after they have been extracted by the optical system.

4 Claims, 13 Drawing Sheets

- ↕ P-POLARIZED BEAM
- •—• S-POLARIZED BEAM

OPTICAL INFORMATION RECORDING AND REPRODUCING APPARATUS

BACKGROUND OF THE INVENTION

1. Field of the Invention

The present invention relates to an optical information recording and reproducing apparatus which is adapted to radiate a plurality of beams onto an information recording medium for recording information optically and reproducing the information just recorded.

2. Description of the Related Art

An optical information recording and reproducing apparatus can optically record and reproduce much more information concentrically or spirally on and from a rotating disk-shaped information recording medium with a higher density than a conventional apparatus employing a magnetic disk. Such an optical recording and reproducing apparatus therefore has the advantage that it can provide a greater recording capacity. However, an information recording medium employed in an optical information recording and reproducing apparatus encounters defects more often than a magnetic disk medium does, thus making it necessary to provide the apparatus with a function of maintaining the reliability of recorded information. To meet this requirement, a two-beam optical head has been proposed. This optical head uses a recording beam and a reproducing beam each having a different wavelength. These beams each form a spot, and the recording beam spot is used in recording whereas the reproducing beam spot is used in reproduction immediately after the recording.

FIG. 15 illustrates a conventional two-beam optical head, which is shown in, for instance, Theses at 15th Microoptical Meeting (pages 58 to 62). In the drawing, a recording semiconductor laser 1 radiates a recording beam 2 (indicated by broken lines) which has a wavelength λ1 (e.g., 830 nm), while a reproduction semiconductor laser 3 radiates a reproducing beam 4 (indicated by solid lines) which has a wavelength λ2 (e.g., 780 nm). The beams 2 and 4 each become a parallel beam after passing through a collimator lens 5 or 6. A triangular prism 7 is provided to change the cross-sectional configuration of the recording beam 2 into a generally oval shape. An interference filter 8 acts to allow a beam of the wavelength λ2 to pass therethrough while reflecting beams of other wavelengths. A dichroic prism 9 acts to allow a beam of the wavelength λ2 to pass therethrough while reflecting a beam of the wavelength λ1. A polarized beam splitter 10 is disposed in such a manner as to face the interference filter 8 and the dichroic prism 9. An objective 12 faces the splitter 10 with a one-quarter wave plate 11 therebetween, and an information recording medium 13 faces the objective 12. The recording beam 2 converges on the information recording medium 13 to form a recording spot 14, while the reproducing beam 4 converges on the medium 13 to form a reproducing spot 15. A detection optical system 16 is provided for receiving and detecting the reproducing beam 4 reflected by the information recording medium 13, and the system 16 comprises a convergent lens 17, a cylindrical lens 18, and a photodetector 19. Another photodetector 20 acts to receive and detect the recording beam 2 reflected by the information recording medium 13, and it is provided for the purposes of, for instance, detecting whether the radiation of the recording semiconductor laser 1 is correct or not.

The functions provided by the detection optical system 16 include detecting a reproduction signal and servo signals (i.e., a focusing error signal, and a tracking error signal).

In the optical head having the above-described structure, the recording beam 2 of the wavelength λ1 is radiated from the recording semiconductor laser 1, is reflected by the interference filter 8, and is then transmitted through the polarized beam splitter 10 since the beam 2 comprises components which are all p-polarized components with respect to the splitter 10. Thereafter, the recording beam 2 forms a recording spot 14 on the information recording medium 13 so as to record information. The recording beam 2 reflected by the information recording medium 13 transits the one-quarter wave plate 11 twice while it makes back-and-forth trips between the medium 13 and the polarized beam splitter 10, whereby its direction of polarization is rotated through 90 degrees so that the beam 2 becomes an s-polarized beam. The beam 2 is therefore reflected by the polarized beam splitter 10, and it is further reflected by the dichroic prism 9, finally being received by the photodetector 20. On the other hand, the reproducing beam 4 of the wavelength λ2 is radiated from the reproducing semiconductor laser 3, passes through the dichroic prism 9, and is reflected by the polarized beam splitter 10 since the beam 4 comprises components which are all s-polarized components with respect to the splitter 10. Thereafter, the reproducing beam 4 forms a reproducing spot 15 on the information recording medium 13 so as to reproduce the information. The reproducing beam 4 reflected by the information recording medium 13 transits the one-quarter wave plate 11 twice while it makes back-and-forth trips between the medium 13 and the polarized beam splitter 10, whereby its direction of polarization is rotated through 90 degrees so that the beam 4 becomes a p-polarized beam. The beam 4 is therefore transmitted through the polarized beam splitter 10 and its transmitted through the interference filter 8, finally entering the detection optical system 16.

FIG. 16 illustrates the relationship between the recording and reproducing spots and the information recording medium. In this drawing, it is assumed that the information recording medium 13 rotates in the direction of an arrow J. Information is recorded as pits 21 which are each formed in the medium 13 by the recording spot 14. The reproducing spot 15 is positioned at a distance l behind the recording spot 14, and the pits 21 which have just been recorded are sequentially reproduced. In this way, information can be reproduced as the recording proceeds.

The conventional two-beam head having the abovedescribed arrangement encounters the following problems. First, in order to detect reproduction signals with a high level of sensitivity, it is necessary to use two semiconductor lasers to produce beams, i.e., recording and reproducing beams, with a large difference in wavelength therebetween. Secondly, the optical elements used for discriminating beams by difference in wavelength, such as the dichroic prism and the interference filter, must have strict wavelength discriminating characteristics, in addition to the requirement that the semiconductor lasers must generate beams whose fluctuations in wavelength are sufficiently small. Thirdly, since the same one-quarter wave plate is used for the beams of the two different wavelengths, the direction of the polarization of the recording or reproducing beam cannot be completely rotated through 90 degrees. As a result, the separation of the beams by the polarized beam splitter cannot be complete, adversely affecting the level of resultant signals.

SUMMARY OF THE PRESENT INVENTION

The present invention has been accomplished in order to solve the above-stated problems. An object of the present invention is to provide an optical information recording and reproducing apparatus which enables reproduction signals to be detected with a high level of sensitivity and reliability, while making it possible to use beams of the same wavelength which are radiated from a semiconductor laser, simultaneously making it unnecessary to use any optical elements of the kind which have been conventionally required to have strict wavelength discrimination characteristics.

According to the present invention, there is provided an optical information recording and reproducing apparatus adapted to radiate a plurality of beams onto an information recording medium so as to optically record information on the medium as well as reproduce the information just recorded, comprising:

beam generating means for radiating a plurality of beams of the same wavelength;

an optical system for radiating the plurality of beams onto the information recording medium in such a manner that spots formed by the beams are arranged in the direction in which the information is being recorded, and for extracting the plurality of beams reflected by the information recording medium; and optical detection means for detecting each of the plurality of beams after they have been extracted by the optical system.

The apparatus in accordance with the present invention uses a plurality of beams of the same wavelength for the recording and the reproduction of information. Therefore, reproduction signals can be detected with excellent levels of sensitivity and reliability, using simple optical systems.

BRIEF DESCRIPTION OF THE DRAWINGS

FIGS. 9 and 10 illustrate a modification of the third embodiment, wherein FIG. 9 is a block diagram showing essential parts and FIG. 10 is a timing chart showing the operation of the modification;

DESCRIPTION OF THE PREFERRED EMBODIMENTS

Certain embodiments of the present invention will be described hereunder with reference to the accompanying drawings.

Figure 1:
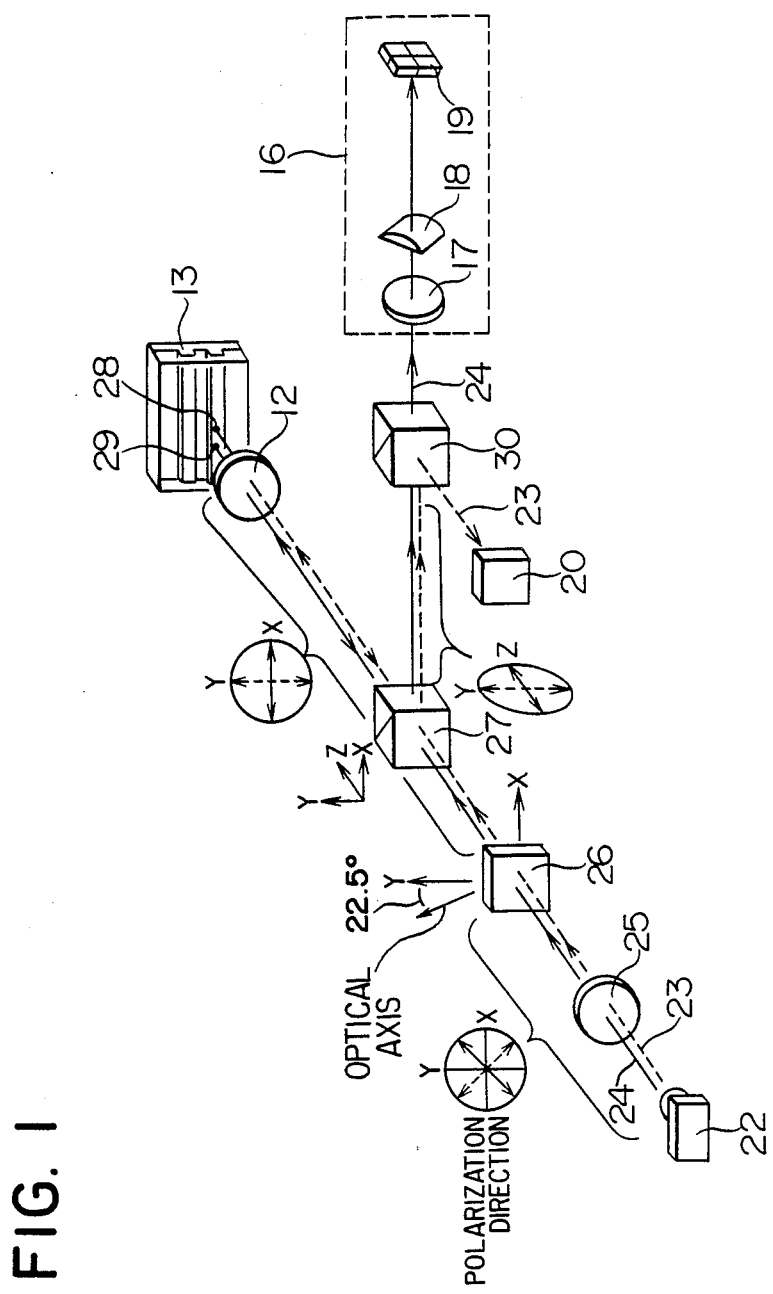
FIG. 1 is a perspective view of optical systems, which illustrates a first embodiment of the present invention.
Figure 2:
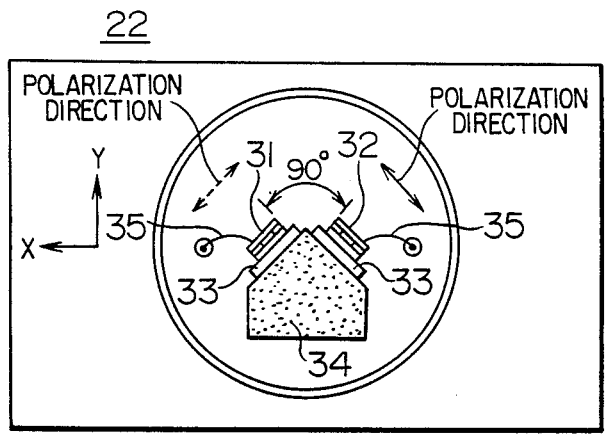
FIG. 2 is a front view of a semiconductor laser shown in FIG. 1.
Figure 15:
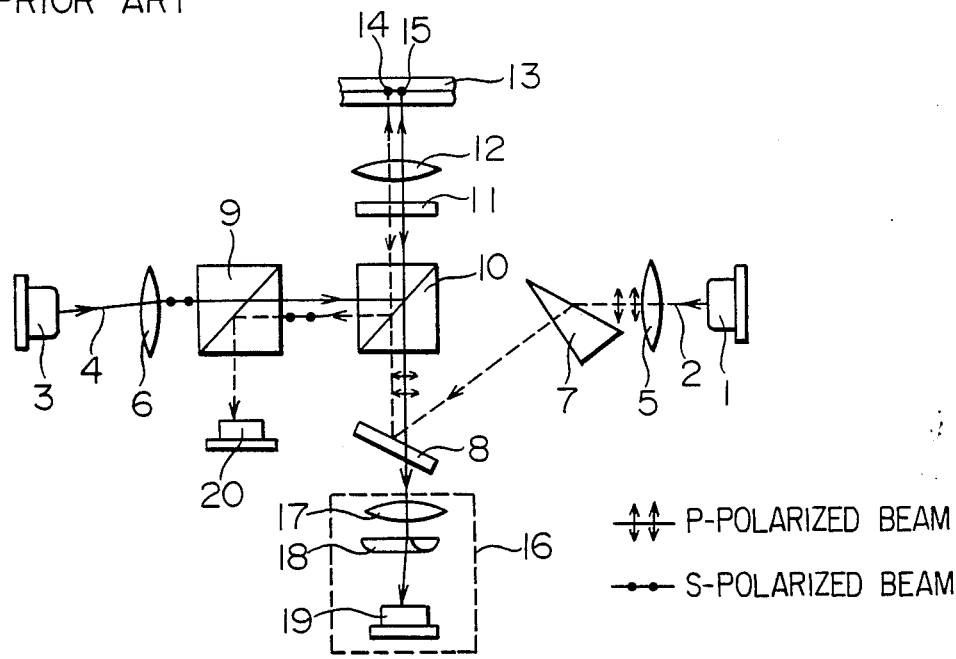
FIG. 15 is a view of optical paths, which illustrates a conventional optical information recording and reproducing apparatus.
Figure 16:
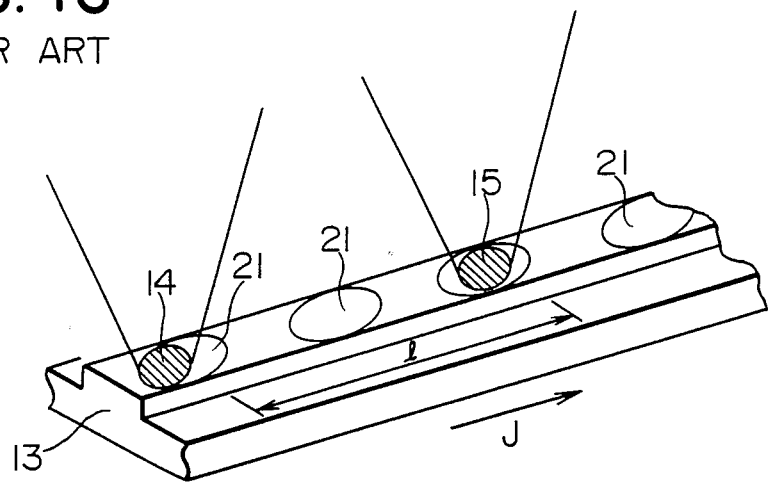
FIG. 16 is a view showng the position of spots shown in FIG. 15.

FIGS. 1 and 2 illustrate a first embodiment of the present invention. Referring to FIG. 1, reference numerals 12, 13, and 16 to 20 denote components which are the same as those shown in FIG. 15. A two-beam semiconductor laser 22 incorporates two semiconductor laser elements (described later in detail) which oscillate at the same two wavelengths. A recording beam 23 is radiated from one of these semiconductor laser elements, while a reproducing beam 24 is radiated from the other. A collimator lens 25 acts to make each of the recording and reproducing beams 23 and 24 into a parallel beam. A one-half wave plate 26 is disposed in such a manner that its optical axis is inclined at 22.5 degrees from the +Y axis toward the −X axis in the X-Y plane shown in FIG. 1. A half prism 27 is disposed between the one-half wave plate 26 and the objective 12. The recording beam 23 is condensed onto a recording spot 28 by the objective 12, while the reproducing beam 24 is condensed onto a reproducing spot 29 thereby. A polarized beam splitter 30 acts to separate the recording beam 23 and the reproducing beam 24 from each other after the beams 23 and 24 have been reflected by the information recording medium 13.

FIG. 2 is a front view of the two-beam semiconductor laser 22, showing the front end of the laser 22 from which the laser beams are radiated. A recording semiconductor laser element 31 and a reproducing semiconductor laser element 32 are inclined in opposite directions at 45 degrees from the Y axis shown in FIG. 2, that is, the reproducing semiconductor laser element 32 is incined at 90 degrees with respect to the recording semiconductor laser element 31, and vice versa. The semiconductor laser elements 31 and 32 are provided on heat sinks 33 and 34. The laser 22 also includes wires 35 for supplying the semiconductor laser elements 31 and 32 with electric current.

Next, the operation of the optical information recording and reproducing apparatus having the abovedescribed costruction will be described. Since the two-beam semiconductor laser 22 shown in FIG. 2 has two semiconductor laser elements 31 and 32 which are each inclined at 45 degrees from the +Y axis, polarized beams from the oscillating laser elements are directed as follows: as indicated by the broken arrows in FIG. 2, the direction of a polarized recording beam from the recording semiconductor laser element 31 is inclined at 45 degrees from the +Y axis toward the −X axis in the X-Y plane shown in FIG. 2 (this plane is the same as that shown in FIG. 1); while, as indicated by the solid arrows in FIG. 2, the direction of a polarized reproducing beam from the reproducing semiconductor laser element 32 is inclined at 45 degrees from the +Y axis toward the +X axis.

The semiconductor laser 22 having the above-described construction is used in the optical systems shown in FIG. 1. Referring to FIG. 1, a polarized recording beam 23 and a polarized reproducing beam 24 are each inclined at 45 degrees from the Y axis in opposite directions until just before they enter the one-half wave plate 26. By passing through the one-half wave plate 26, the direction of the polarized recording beam 23 is changed to a direction which is parallel to the Y axis, while the direction of the polarized reproducing beam 24 is changed to a direction which is parallel to the X axis. Each of the beams 23 and 24 then passes through the half prism 27, and subsequently each beam is focused by the objective 12 to form a recording spot 28 or reproducing spot 29 on the surface of the information recording medium 13. Parts of these beams 23 and 24 reflected by the information recording medium 13 are further reflected by the half prism 27, and then enter the polarized beam splitter 30. At this point, since the direction of polarization of the recording beam 23 is parallel to the Y axis, the recording beam 23 is an s-polarized beam with respect to the polarized beam splitter 30. The recording beam 23 is therefore reflected by the polarized beam splitter 30 and enters the photodetector 20. In contrast, since the direction of polarization of the reproducing beam 24 is parallel to the Z axis, the reproducing beam 24 is a p-polarized beam with respect to the polarized beam splitter 30. The reproducing beam 24 is therefore transmitted through the polarized beam splitter 30 and enters the detection optical system 16. The outputs of the photodetector 20 are used to determine various factors such as whether or not the radiation of the recording semiconductor laser element 31 is correct. The outputs of the photodetector 19 of the detection optical system 16 are used to detect reproduction signals immediately after the recording as well as servo signals (i.e., focusing error signals, and tracking error signals).

Although in the above-described embodiment the one-half wave plate 26 is disposed between the collimator lens 25 and the half prism 27, the plate 26 may alternatively be disposed between the half prism 27 and the polarized beam splitter 30.

Further, although in the above-described embodiment the structure is such that the detection optical system 16 is disposed in alignment with the optical axis of a beam which has been transmitted through the polarized beam splitter 30, while the photodetector 20 for detecting the recording beam 23 is disposed in alignment with the optical axis of a beam which has been reflected by the splitter 30, the structure may alternatively have the reverse arrangement.

Figure 3:
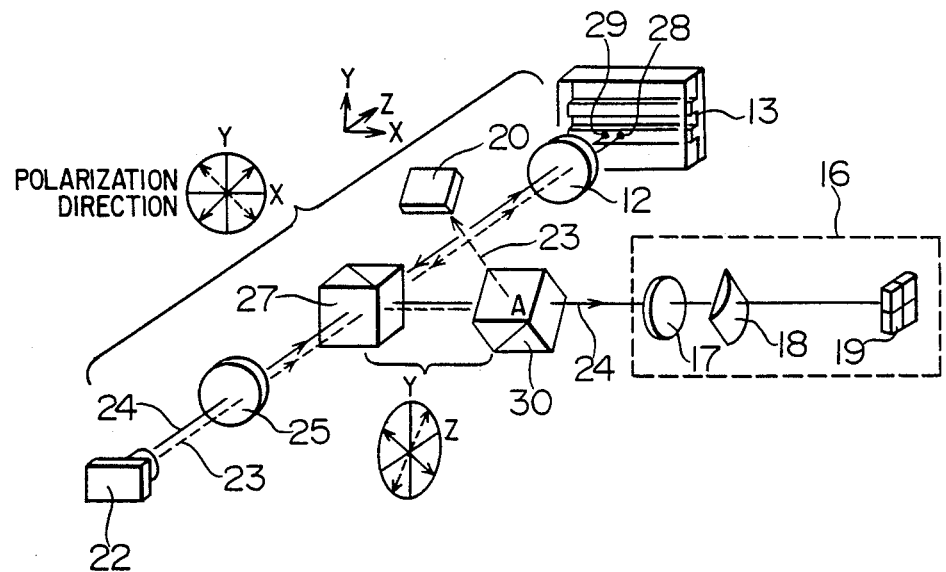
FIG. 3 is a perspective view of optical systems, which illustrates a modification of the first embodiment.

Still further, although in the above-described embodiment the one-half wave plate 26 is used to rotate the direction of polarization of each of the two beams through 45 degrees, that embodiment may be modified by omitting the one-half wave plate, as illustrated in FIG. 3. Referring to FIG. 3, all reference numerals denote components corresponding to those shown in FIG. 1. Because of the omission of the one-half wave plate, when the recording and reproducing beams 23 and 24 are radiated onto the information recording medium 13, the direction of polarization of each beam 23 or 24 is inclined at 45 degrees from the Y axis in the X-Y plane shown in FIG. 3. In addition, the directions of polarization of these two beams 23 and 24 reflected by the information recording medium 13 and then by the half prism 27 are such that the recording beam 23 is inclined at 45 degrees from the +Y axis in the Y-Z plane toward the +Z axis, while the reproducing beam 24 is inclined at 45 degrees therefrom toward the −Z axis. Accordingly, if the polarized beam splitter 30 is disposed in such a manner that a line normal to the surface A (shown in FIG. 3) of the polarized beam splitter 30 is aligned with the direction of polarization of a reproducing beam 24, the recording beam 23, which is s-polarized with respect to the polarized beam splitter 30, is reflected by the splitter 30, while the reproducing beam 24, which is p-polarized with respect to the splitter 30, is transmitted therethrough. This arrangement therefore enables the polarized beam splitter 30 to separate the recording and reproducing beams 23 and 24. In this way, the modification provides the same effects as those of the embodiment shown in FIG. 1.

As described above, according to the foregoing embodiment of the present invention, an optical information recording and reproducing apparatus has a pair of semiconductor laser elements which oscillate at the same wavelength. These elements are incorporated in a single package in such a manner that they radiate beams whose directions of polarization differ by an angle of 90 degrees. Recording and reproducing beams radiated from the semiconductor laser elements are reflected by an information recording medium, then separated from each other by a polarized beam splitter. Therefore, it is possible to detect reproduction signals with excellent levels of sensitivity and reliability, using simple optical systems and without requiring any optical elements having strict optical characteristics.

The apparatus may alternatively be adapted to extract recording and reproducing beams of the same wavelength from an ordinary one-beam semiconductor laser.

Figure 4:
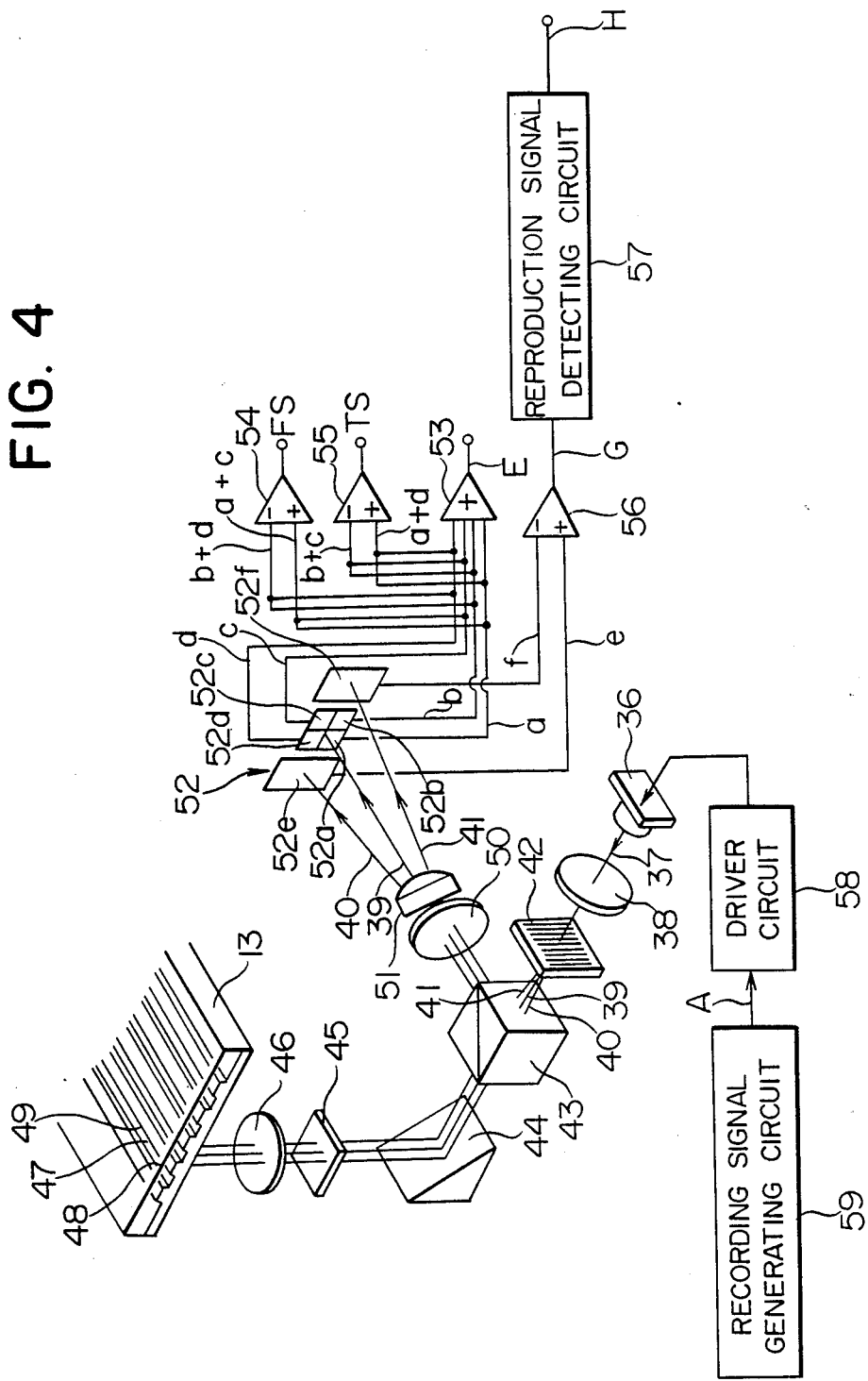
FIG. 4 is a view illustrating a second embodiment of the present invention.

A second embodiment of the present invention has such an arrangement. Referring to FIG. 4, a semiconductor laser 36 radiates one beam 37. On the beam radiation side of the semiconductor laser 36, the following elements are serially disposed in sequence: a collimator lens 38 for making the beam 37 a parallel beam, a diffraction grating 42 for splitting the beam 37 into first to third beams 39 to 41, a polarized beam splitter 43 for receiving each of the first to third beams 39 to 41, and a reflection mirror 44 for reflecting upward each of the beams 39 to 41 which have been transmitted through the polarized beam splitter 43. Although in FIG. 4 the diffraction grating 42 is disposed between the collimator lens 38 and the polarized beam splitter 43, the diffraction grating 42 may alternatively be disposed between the semiconductor laser 36 and the collimator lens 38.

A one-quarter wave plate 45 and an objective 46 are serially disposed on the axes of the first to third beams 39 to 41 that are reflected upward by the reflection mirror 44, and an information recording medium 13 is disposed above the objective 46, so that the first to third beams 39 to 41 are condensed onto the surface of the information recording medium 13 by the objective 46 in such a manner as to form first to third spots 47 to 49, respectively.

On one side of the polarized beam splitter 43 there are disposed a convergent lens 50 for converging the beams 39 to 41 reflected by the information recording medium 13, and a cylindrical lens 51 for converging each of the beams 39 to 41 which have been transmitted through the convergent lens 50 in one direction. A photodetector 52 is disposed in front of the cylindrical lens 51.

The photodetector 52 is a six-part detector which has six light-receiving surfaces 52a to 52f. The first beam 39 is received by a first light-receiving portion of the photodetector 52 which comprises four adjacent light-receiving surfaces 52a to 52d disposed in a cross-shape. A second light-receiving portion comprising the light-receiving surface 52e is disposed on one side of the first light-receiving portion so as to receive the second beam 40, while a third light-receiving portion comprising the light-receiving surface 52f is disposed on the other side so as to receive the third beam 41. An adder 53 and two operational amplifiers 54 and 55 are connected to the first light-receiving portion of the photodetector 52.

The adder 53 operates to calculate the sum (a+b+c+d) of signals a to d output from the four light-receiving surfaces 52a to 25d of the first light-receiving portion of the photodetector 52. The first operational amplifier 54 operates to calculate the difference (a+c−b−d) between a sum (a+c) signal expressing the sum of the signals a and c and a sum (b+d) signal expressing the sum of the signals b and d. An output FS of this operational amplifier 54 is used as a signal for detecting any focusing error by an astigmatism method. The second operational amplifier 55 operates to calculate the difference (a+d−b−c) between a sum (a+d) signal expressing the sum of the signals a and d and a sum (b+c) signal expressing the sum of the signals b and c. An output TS of this operational amplifier 55 is used as a signal for detecting any tracking error by a push-pull method.

A further operational amplifier 56 is connected to the light-receiving surfaces 52e and 52f which form the second and third light-receiving portions of the photodetector 52, respectively. The differential amplifier 56 operates to compare a signal e output from the light-receiving surface 52e and a signal f output from the light-receiving surface 52f by calculating the difference therebetween. A reproduction signal detecting circuit 57 is connected to this differential amplifier 56, and a signal G output from the differential amplifier 56 is subjected to waveform shaping to provide a reproduction signal H.

A driver circuit 58 is connected to the semiconductor laser 36 for driving the laser 36. A recording signal generating circuit 59 is connected to the driver circuit 58 for supplying the circuit 58 with pulse trains of a recording signal A.

Of the first to third beams 39 to 41 split by the diffraction grating 42, the first beam 39 at the center is a 0-order diffracted beam having a high intensity, while the second and third beams 40 and 41 on either side of the first beam 39 are the +1- and −1-order diffracted beams, respectively, which have low, but equal, intensities. The ratio between the intensity of the first beam 39 and the intensity of the second or third beam 40 or 41 can be set to any desired value by suitably designing the diffraction grating 42.

Figure 5:
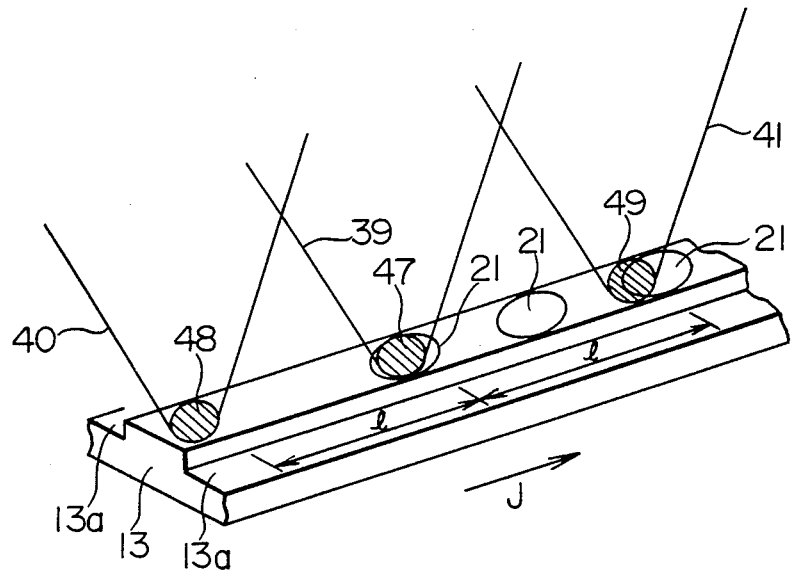
FIG. 5 is a view showing the position of spots formed in the second embodiment.

These beams 39 to 41 form the first to third spots 47 to 49 on the information recording medium 13, as shown in FIG. 5. The spots 47 to 49 are located between two adjacent guide grooves 13a formed in the information recording medium 13, with the second and third spots 48 and 49 on either side of the first spot 47, separated therefrom by a distance l. If it is assumed that the information recording medium 13 is rotating in the direction of an arrow J, the second spot 48 is the distance l ahead of the first spot 47, while the third spot 49 is the distance l behind the first spot 47. Reference numerals 21 shown in FIG. 5 denote pits written into the surface of the information recording medium 13.

Next, the operation of the second embodiment will be described with reference to the timing chart shown in FIG. 6.

When it is necessary to reproduce information that has already been recorded, the driver circuit 58 drives the semiconductor laser 36 at a predetermined reproduction level A0, and a first beam 39, which is at the center of the group of beams, is radiated onto the information recording medium 13 to form a first spot 47 on a pit 21 in the medium. The reproduction level A0 is set at a level low enough to prevent it from adversely affecting the configuration of the pits 21 in the information recording medium 13.

The first beam 39 reflected by the information recording medium 13 is detected by the four light-receiving surfaces 52a to 52d of the first light-receiving portion of the photodetector 52, and an output E of the adder 53 is used as a reproduction signal.

When it is necessary to record new information on the information recording medium 13, the driver circuit 58 is supplied with a recording medium signal A output from the recording signal generating circuit 59 so as to drive the semiconductor laser 36 in accordance with the signal A, and the semiconductor laser 36 radiates a beam 37 which is modulated in accordance with the recording signal A. The beam 37 is split by the diffraction grating 42 into first, second, and third beams 39, 40, and 41, whose intensities are at a predetermined ratio. The first to third beams 39 to 41 pass through the polarized beam splitter 43, are reflected by the reflection mirror 44, and pass through the one-quarter wave plate 45 as well as the objective 46, and they are then radiated onto the information recording medium 13 to form first to third spots 47 to 49, respectively.

The pulse train of the first beam 39, which has a high intensity and is at the center, comprises modulated pulse portions which are each at a recording level A1 that is sufficient to form a pit 21 on the information recording medium 13, and non-recording portions which are each at the reproduction level A0. The pulse train of the first beam 39 is represented as a recording output A' in FIG. 6. The pulse trains (neither of which is shown) of the second and third beams 40 and 41 each have a waveform corresponding to that of the recording output A' and each pulse train is always kept at a level equal to or lower than the reproduction level A0 and thus has its level held low enough to prevent the beams 40 and 41 from adversely affecting the formation of pits 21.

Figure 6:
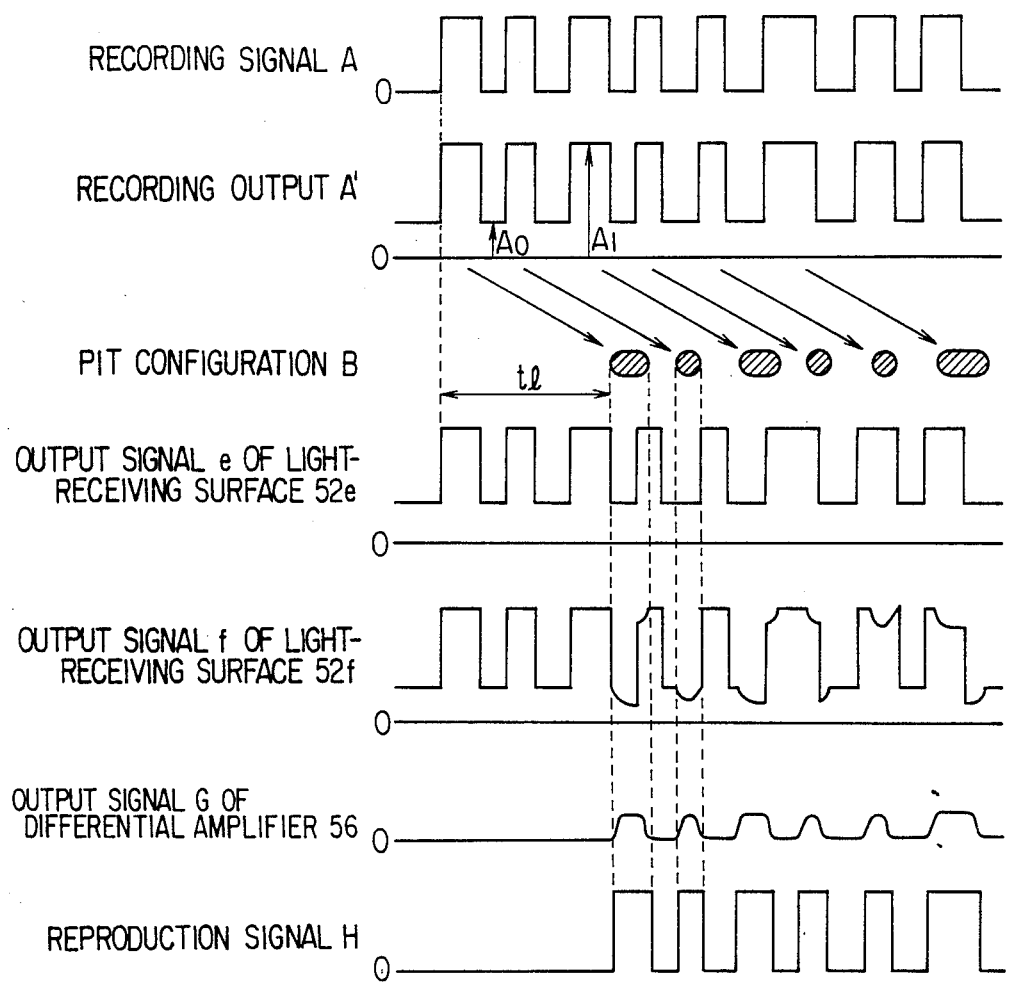
FIG. 6 is a timing chart showing the operation of the second embodiment.

With this arrangement, therefore, as the first beam 39 forms a first spot 47 on the information recording medium 13, a pit 21 having the configuration B shown in FIG. 6 is formed in the medium 13. The second beam 40 forms a second spot 48 which is a distance l ahead of the first spot 47 and which is always cast on the part of the information recording medium 13 where no information has been recorded yet. The third beam 41 forms a third spot 49 which is a distance l behind the first spot 47 and which is cast on a pit 21 which has just been recorded.

Thereafter, the first to third beams 39 to 41 reflected by the information recording medium 13 again pass through the objective 46 and the one-quarter wave plate 45. By this action, since the beams 39 to 41 transmit through the one-quarter wave plate 45 twice while they make back-and-forth trips, their directions of polarization are each rotated through 90 degrees. The beams 39 to 41 are therefore reflected by the polarized beam splitter 43.

Subsequently, the first to third beams 39 to 41 pass through the convergent lens 50 and the cylindrical lens 51, and they are then received by the first to third light-receiving portions of the photodetector 52, respectively.

The first beam 39 received by the first light-receiving portion of the photodetector 52 is detected by the adder 53 as pulse waveforms corresponding to those of the recording signal A, and the result of this detection is used to determine whether or not there is any obstacle on the information recording medium 13 or in the optical path. The operational amplifiers 54 and 55, which are also connected to the first light-receiving portion, output a focusing error detection signal FS and a tracking error detection signal TS.

Meanwhile, the second and third beams 40 and 41 are respectively received by the light-receiving surfaces 52e and 52f which serve as the second and third light-receiving portions, respectively. As shown in FIG. 5, the second spot 48 formed on the information recording medium 13 by the second beam 40 is always ahead of the first spot 47, and is therefore cast on the part of the medium 13 where there are no pits 21. Accordingly, the intensity of the second beam 40 reflected by the information recording medium 13 is not varied by any pit 21, and the signal e output from the light-receiving surface 52e has a waveform corresponding to that of the recording output A'.

On the other hand, the third spot 49 formed by the third beam 41 is always behind the first spot 47, and is therefore cast on the part of the medium 13 where there are pits 21. Accordingly, the intensity of the third beam 41 is varied in accordance with the configuration of the pits 21 that have been formed. That is, because the beam 41 is reflected by pits 21 that have a low reflectance, the intensity of the reflected third beam 41 is varied in such a manner that it is reduced while the third spot 48 is being cast on a pit 21, whereas it increases to the same level as that of the intensity of the second beam 40 when the pit 21 has passed the spot 48. As a result, as shown in FIG. 6, a signal f output from the light-receiving surface 52f, which detects the reflected third beam 41, expresses variations in the intensity of the beam 41 in accordance with the configuration of the pits 21. In the above-described operation, the timing at which the third spot 49 is cast on a pit 21 is delayed by a time lag tl corresponding to the distance l between the first and third spots 47 and 49.

The differential amplifier 56 is supplied with the signals e and f output from the second and third light-receiving surfaces 52e and 52f and operates to compare the values of these signals by calculating the difference therebetween, thereby extracting only the components of the signal f that express the variations in the reflectance caused by the pits 21. The differential amplifier 56 outputs a signal G which expresses the result of this comparison.

Finally, the reproduction signal detecting circuit 57 is supplied with the signal G output from the differential amplifier 56 and subjects the signal G to waveform shaping. A reproduction signal H output by the circuit 57 comprises a pulse train. As shown in FIG. 6, if the recording has been performed properly, the waveform of the reproduction signal H corresponds to that of the recording signal A which has been output at a time tl before.

Therefore, if the reproduction signal H are compared with the recording signal A, it is possible to determine whether or not the information has been correctly recorded on the information recording medium 13.

Although the above description concerned an example of the information recording medium 13 in which the formation of pits 21 causes reductions in the reflectance of the medium, the information recording medium 13 may alternatively be such that the formation of pits 21 causes increases in the reflectance. The latter arrangement also enables the information-recording condition to be checked.

The reproduction signal H is delayed by the time lag tl from the recording signal A. However, in actual operation, since this time lag tl is in the order of several microseconds, it is considered that the determination as to whether the recording is correct or not can be effected in substantially a real-time manner.

Figure 7:
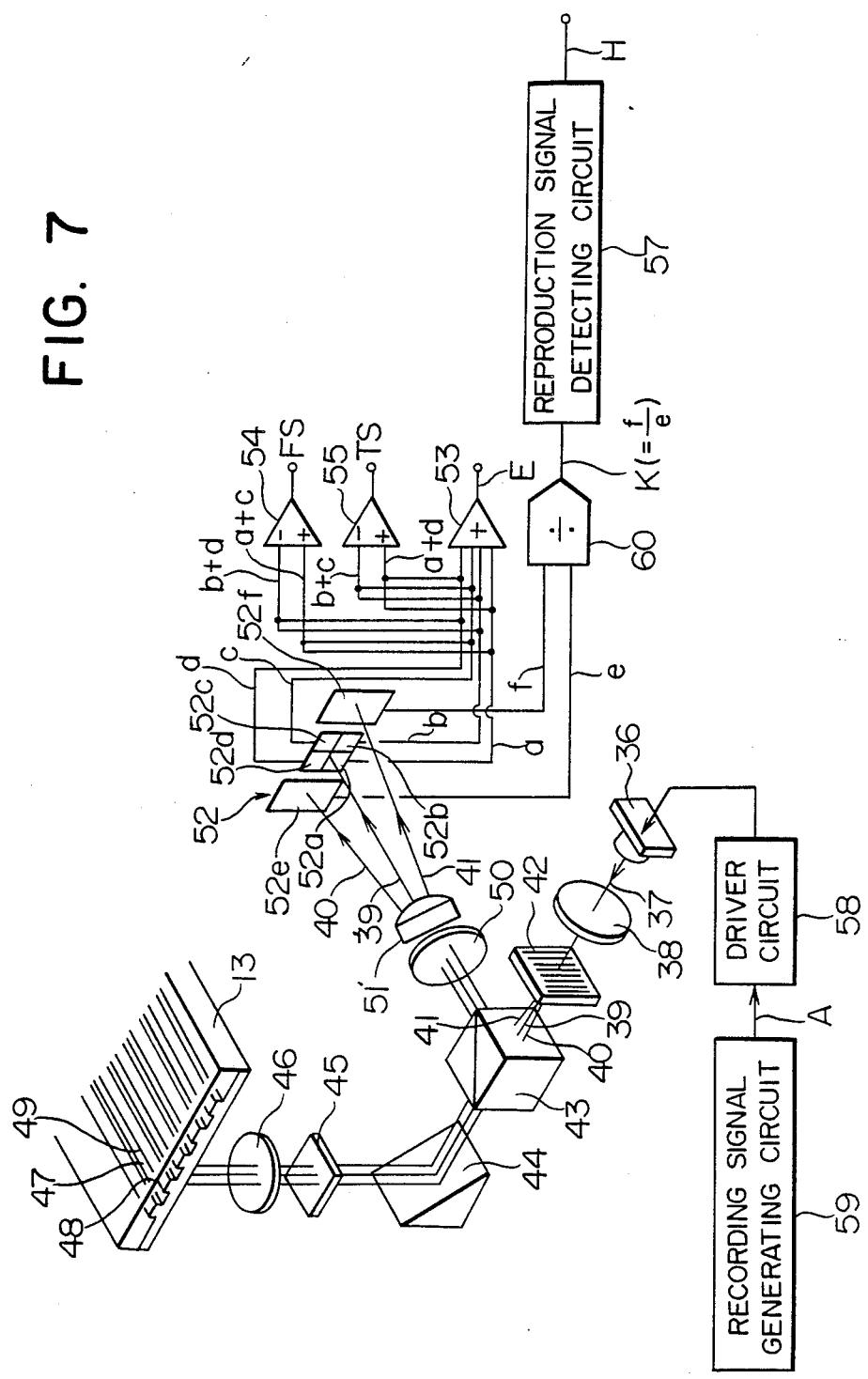
FIG. 7 is a view illustrating a third embodiment of the present invention.
Figure 8:
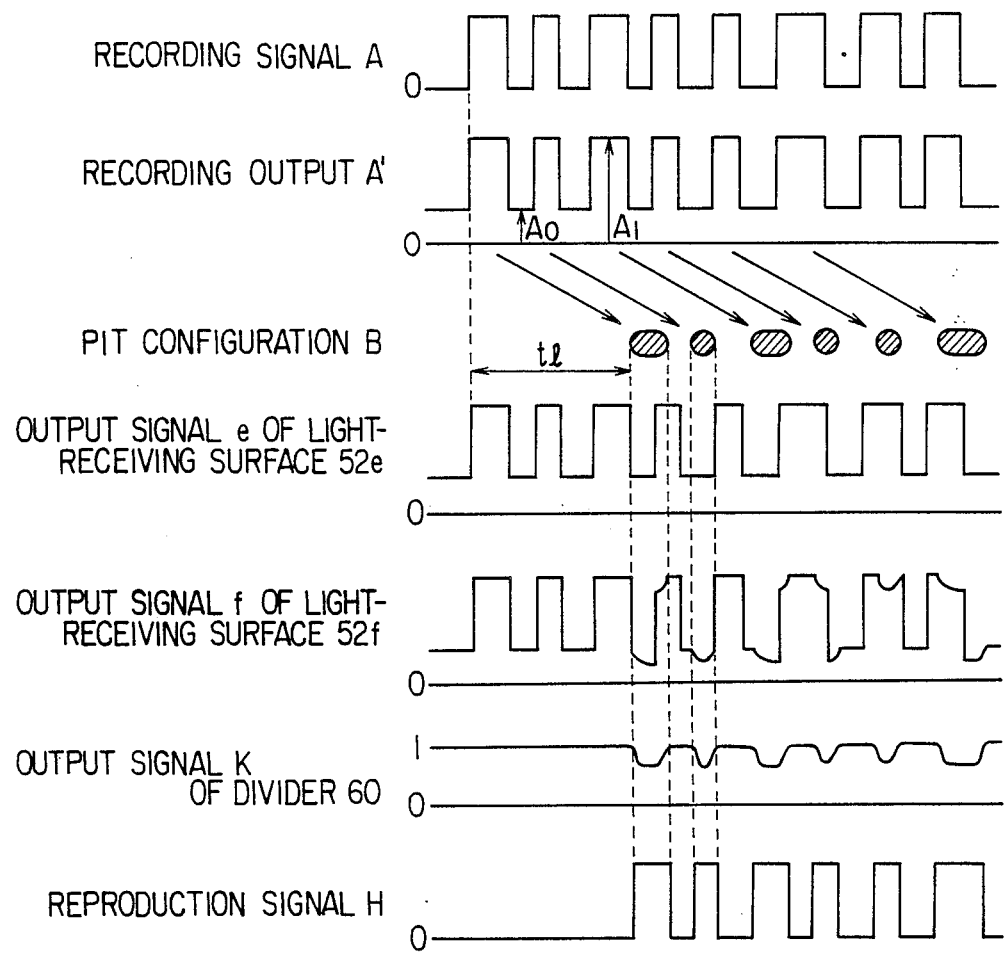
FIG. 8 is a timing chart showing the operation of the third embodiment.

The differential amplifier 56 used in the second embodiment may be replaced by a divider 60, as shown in FIG. 7 illustrating a third embodiment. The divider 60 outputs a signal K (=f/e) through dividing the signal f output from the light-receiving surface 52f by the signal e output from the light-receiving surface 52e. With this arrangement, as shown in FIG. 8, the signal f is normalized by being divided by the signal e, in such a manner that only the components of the signal f that express the variations in reflectance caused by the pits 21 are extracted and are expressed by the signal K. Thereafter, a reproduction signal H is obtained from the reproduction signal detecting circuit 57 in a manner similar to that in the embodiment illustrated in FIG. 4.

Figure 9:
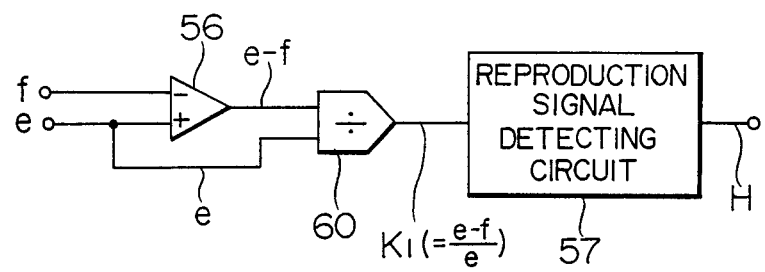

The third embodiment may be modified by inserting an differential amplifier 56, which calculates the difference between the signal values e and f, on the input side of the divider 60, as shown in FIG. 9. With this arrangement, the difference (e−f) between the values of the signals e and f is divided by the signal value e.

In this case, the signal K1 output from the divider 60 is expressed as follows:

$$K1 = (e - f)/e = 1 - (f/e) = 1 - k$$

Figure 10:
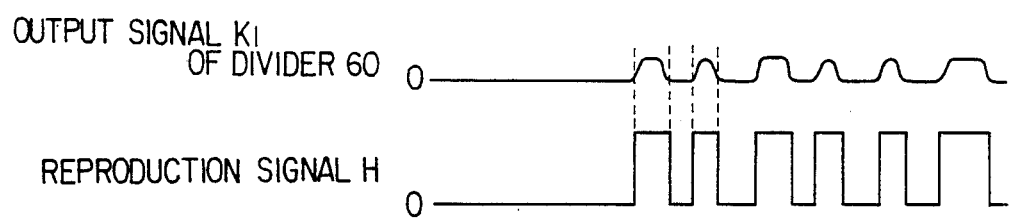

The signal K1 has a waveform shown in FIG. 10. Thus, similarly to the signal K described before, the signal K1 output from the divider 60 also expresses only the components of the signal f that are modulated by the pits 21, thereby extracting these components. A reproduction signal H, which is similar to those in the previous embodiments, is provided by subjecting the signal K1 to waveform shaping in the reproduction signal detecting circuit 57. The signal H is used to determine whether the recording of information is correct or not.

Next, descriptions will be given concerning a fourth embodiment of the present invention in which a reproduction signal H is obtained, using only the first and second beams 39 and 40 of the beams split by a diffraction grating 42 and without using the third beam 41.

Figure 11:
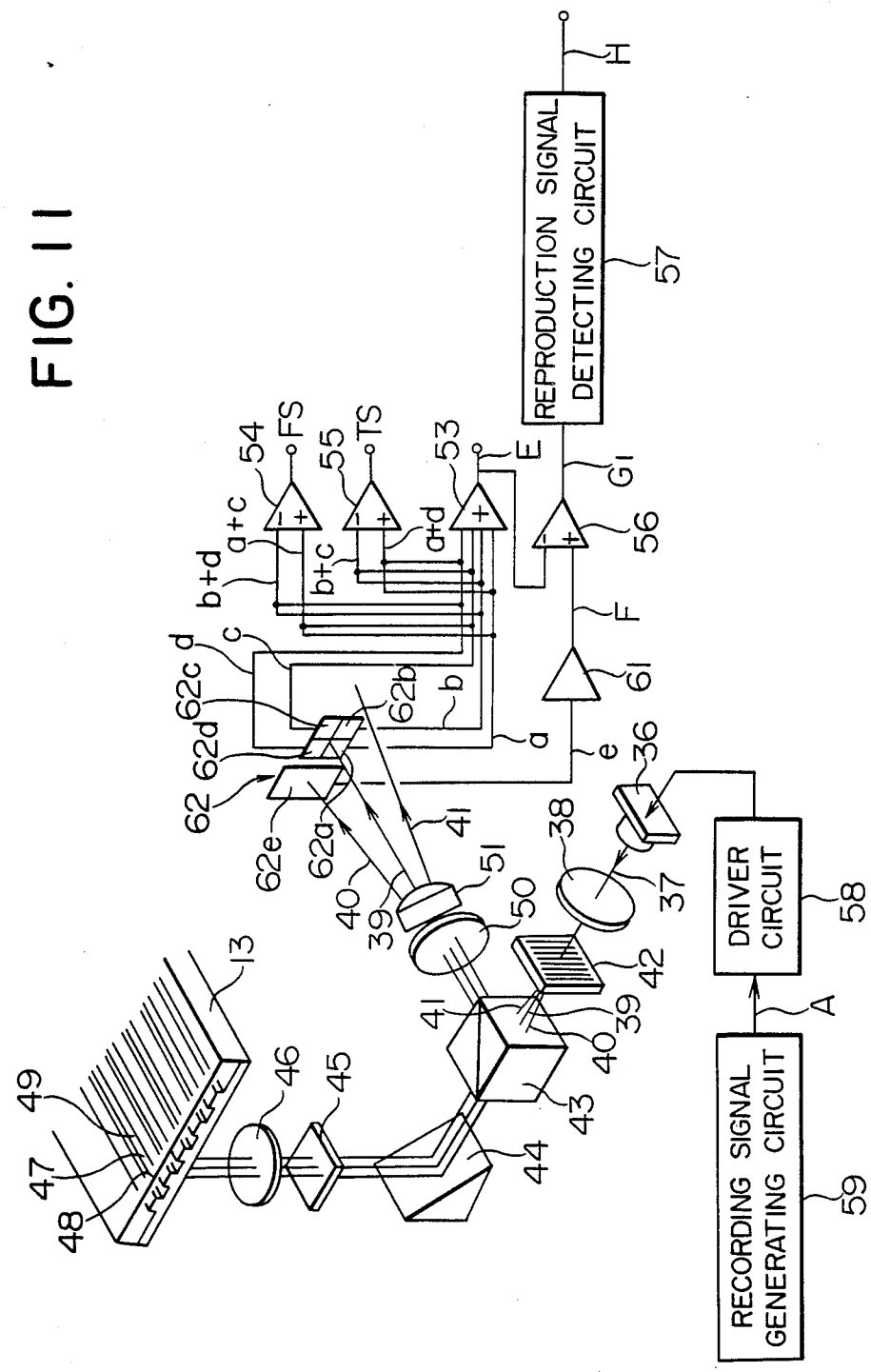
FIG. 11 is a view illustrating a fourth embodiment of the present invention.

Referring to FIG. 11, reference numerals 13, 36 to 51, and 53 to 59 denote components corresponding to those shown in FIG. 4. In addition, the positional relationship between spots 47 to 49 on the information recording medium 13 is the same as that shown in FIG. 5.

A photodetector 62 is disposed in front of the cylindrical lens 51. The photodetector 62 is a five-part photodetector having five light-receiving surfaces 62a to 62e. A first light-receiving portion of the photodetector 62 comprises four adjacent light-receiving surfaces 62a to 62d disposed in a cross-shape, and the first beam 39 is made incident on the center of the first light-receiving portion. A second light-receiving portion comprises a light-receiving surface 52e disposed on one side of the first light-receiving portion, and the second beam 40 is incident on the second light-receiving portion. No light-receiving surface is provided for receiving the third beam 41.

An amplifier 61 is inserted between the light-receiving surface 62e and the differential amplifier 56 for amplifying a signal e output from the light-receiving surface 62e. The amplifier 61 acts to make the signal e into a signal F having the same level as that of a signal E output from the adder 53.

The signal output from the amplifier 61 and the signal output from the adder 53 are input to the differential amplifier 56.

In this embodiment, when it is necessary to reproduce information that has already been recorded, operations performed are basically similar to those in the second embodiment. That is, the semiconductor laser 36 is driven at a predetermined reproduction level A0, the first beam 39 reflected by the information recording medium 13 is received by the photodetector 62, and the output E from the adder 53 is used as a reproduction signal.

When it is necessary to record new information, operations performed are also basically similar to those in the second embodiment. That is, the beam 37 modulated in accordance with the recording signal A is radiated from the semiconductor laser 36, then split into the first to third beams 39 to 41 by the diffraction grating 42, and these beams 39 to 41 are radiated onto the information recording medium 13.

In the latter operations, the pulse train of the first beam 39 comprises modulated pulse portions which are each at a recording level A1, and modulated pulse portions which are each at a reproduction level A0. This pulse train of the first beam 39 is represented as a recording output A' in FIG. 12. On the other hand, the pulse trains (neither of which is shown) of the second and third beams 40 and 41 each have a waveform corresponding to that of the recording output A' and each pulse train is always kept at a level equal to or lower than the reproduction level A0 and thus has its level held low enough to prevent the beams 40 and 41 from adversely affecting the formation of pits 21.

Figure 12:
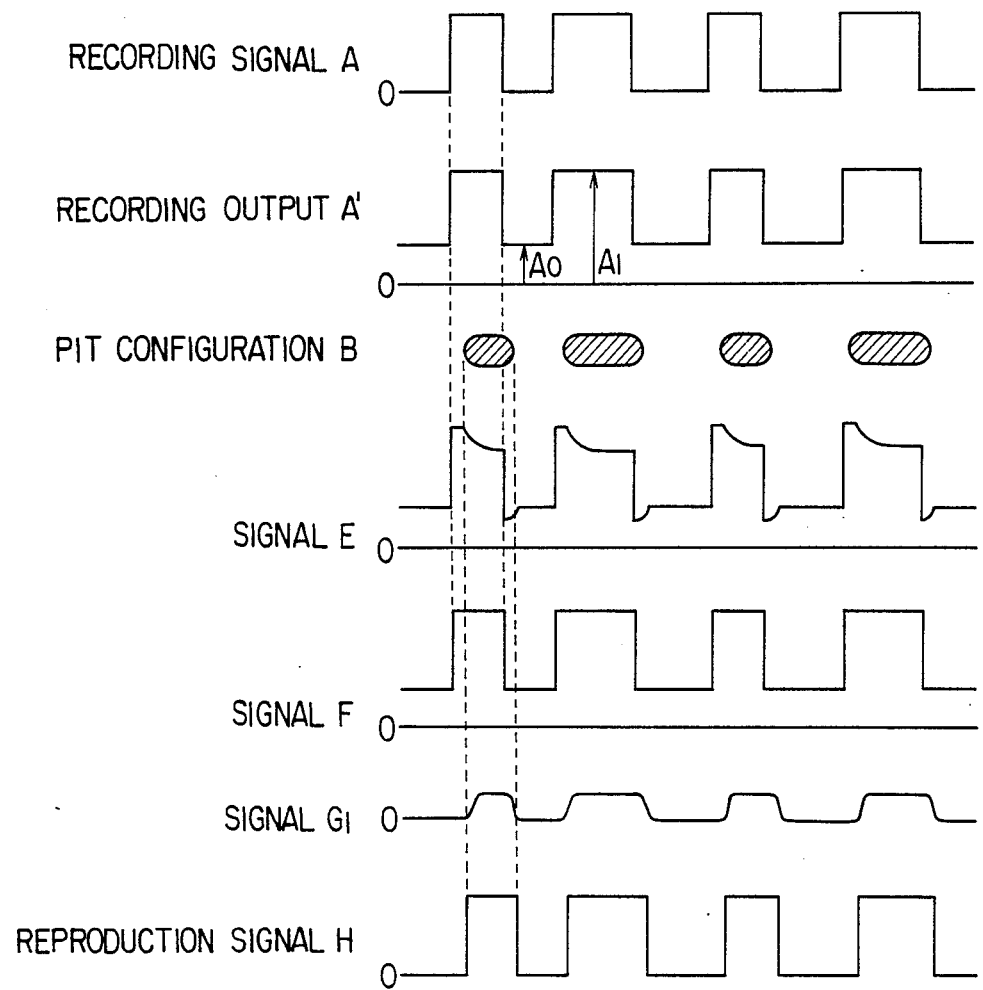
FIG. 12 is a timing chart showing the operation of the fourth embodiment.

When the first beam 39 is radiated onto the information recording medium 13 to form first spots 47, the pulse train of the beam 39, which is at the recording level A1, successively forms pits 21 having the configuration B shown in FIG. 12. In consequence, the level of a signal E output from the adder 53 that corresponds to the intensity of the first beam 39 reflected by the medium 13 varies in accordance with the configuration B of the pits 21 (see FIG. 12).

More specifically, because the reflectance of pits 21 is relatively low, the intensity of the first beam 39 reflected decreases gradually as the formation of a pit 21 proceeds. Further, even when the duration of one recording pulse has been completed and the level of the pulse has changed from the recording level A1 to the reproduction level A0, the intensity of the beam 39 reflected further drops below a level corresponding to the reproduction level A0, so long as the first spot 47 is cast on a part of the pit 21. The intensity of the beam 39 reflected returns to the level corresponding to the reproduction level A0 after the pit 21 has completely passed the spot 47.

Meanwhile, the second beam 40 forms a second spot 48 on the information recording medium 13, which is always ahead of the first spot 47 and is cast on the part of the medium where no information has been recorded yet. Accordingly, the intensity of the second beam 40 reflected by the information recording medium 13 is not varied by any pit 21, and a signal e output from the light-receiving surface 62e of the photodetector 62 has a waveform corresponding to that of the recording output A'.

The amplifier 61 acts to amplify the signal e output from the surface 62e with a previously-adjusted amplification degree, and outputs a signal F whose level has thus been made the same as that of the signal E output from the adder 53.

The differential amplifier 56 compares the signal E output from the adder 53 and the signal F output from the amplifier 61 by calculating the difference between the values of the signals E and F, thereby extracting only the components of the signal E that express the variations in reflectance caused by the pits 21. The differential amplifier 56 outputs a signal G1 which expresses the result of this comparison.

Finally, the reproduction signal detecting circuit 57 is supplied with the signal G1 output from the differential amplifier 56 and subjects the signal to waveform shaping. A reproduction signal H output by the circuit 57 comprises a pulse train. As shown in FIG. 12, if the recording has been performed correctly, the waveform of the reproduction signal H corresponds to that of the recording signal A.

Therefore, if the reproduction signal H is compared with the recording signal A, it is possible to determine whether the information has been correctly recorded on the information recording medium 13.

According to this embodiment, since the second spot 48 which is ahead of the first spot 47 for recording and which is cast on the part of the recording medium where no information has been recorded is used in such a manner that the information-recording condition to be detected simultaneously with the formation of pits 21. Therefore, with this arrangement, any defect in the recording condition can be detected in a real-time manner.

Figure 13:
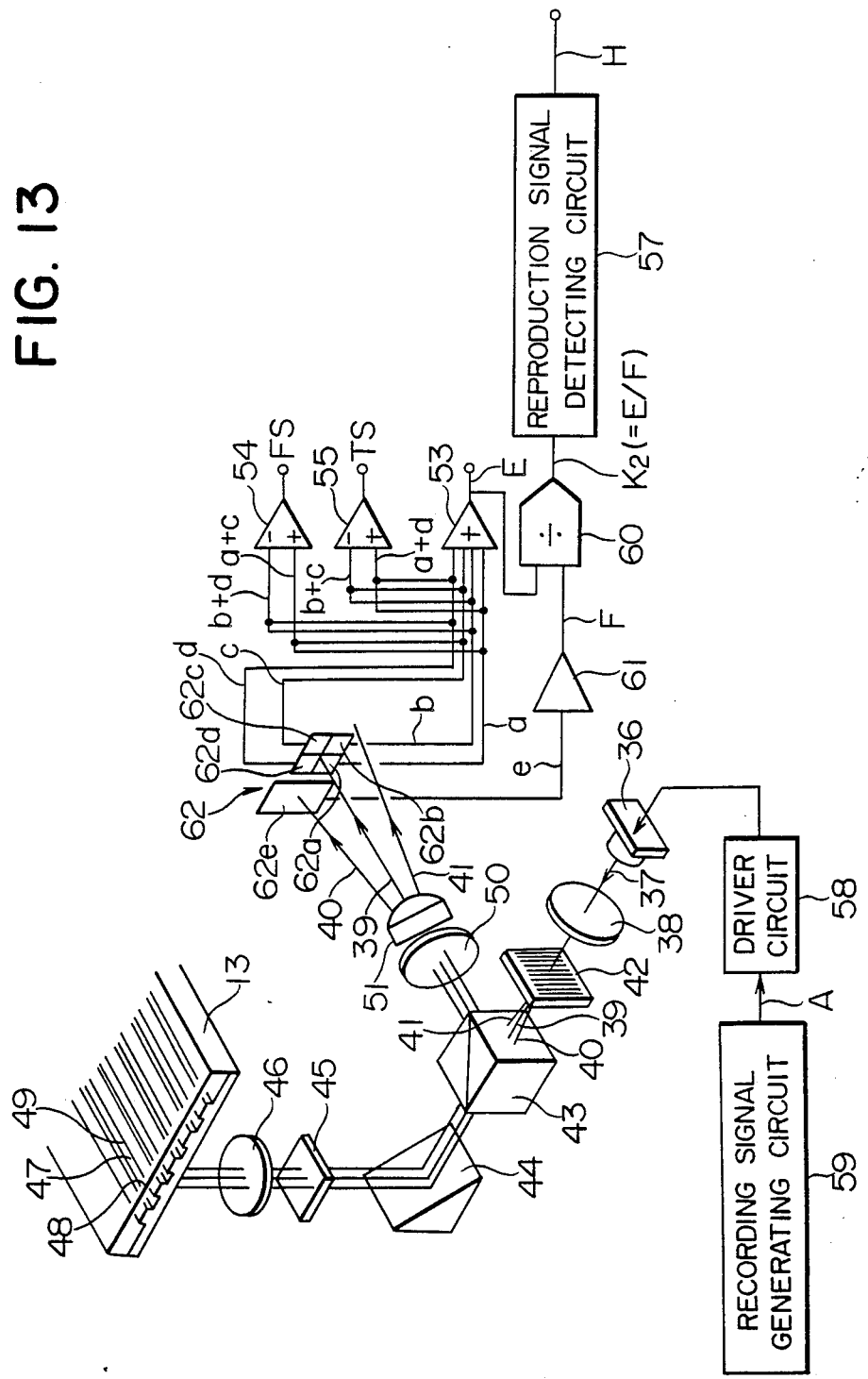
FIG. 13 is a view illustrating a fifth embodiment of the present invention.
Figure 14:
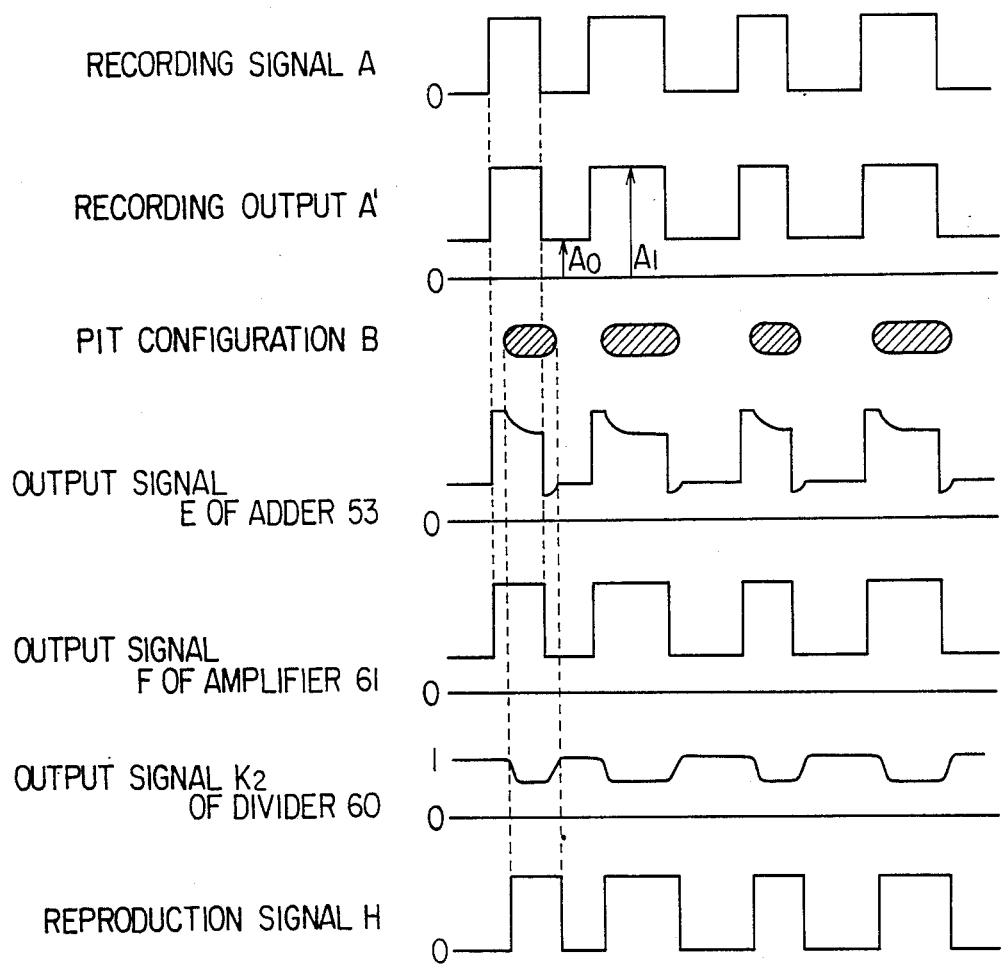
FIG. 14 is a timing chart showing the operation of the fifth embodiment.

The differential amplifier 56 used in the fourth embodiment may be replaced by a divider 60, as shown in FIG. 13 illustrating a fifth embodiment. The divider 60 outputs a signal K2 (=E/F) through dividing the signal E output by the adder 53 by the signal F output by the amplifier 61. With this arrangement, as shown in FIG. 14, the signal E is normalized by being divided by the signal F, in such a manner that only the components of the signal E that express the variations in reflectance caused by the pits 21 are extracted and are expressed by the signal K2 output from the divider 60. Thereafter, a reproduction signal H is provided by the reproduction signal detecting circuit 57 in a manner similar to that described above.

The fifth embodiment may be modified by inserting a differential amplifier 56, which is the same as that shown in FIG. 9, on the input side of the divider 60. With this arrangement, a reproduction signal H is provided in a manner similar to that explained with reference to FIG. 10.

Although in each of the embodiments illustrated in

FIGS. 11 and 13 an amplifier 61 is used to amplify the signal e output from the light-receiving surface 62e of the photodetector 62, the arrangement may alternatively be such that an attenuator (not shown) is inserted between the adder 53 and the differential amplifier 56 or divider 60 so as to attenuate the signal E output from the adder 53, and a signal output from the attenuator and the signal e are subjected to comparison through a suitable calculation.

Further, although in each of the foregoing embodiments a focusing error detecting optical system employs an astigmatism method and a tracking error detecting optical system employs a push-pull method, this is a mere example. Other suitable methods may alternatively be used provided that the configuration of the light-receiving surfaces of the photodetector for detecting the first, second, and third beams 39, 40, and 41 is suitably altered in accordance with the methods used.

What is claimed is:

1. An optical information recording and reproducing apparatus for radiating a plurality of beams onto an information recording medium for optically recording information on said medium and for reproducing information recorded on said medium comprising:
   a laser for emitting a beam of light;
   a diffraction grating for splitting the beam of light into a 0 order first beam and into +1 order and −1 order second and third beams, respectively;
   an optical apparatus for illuminating areas of an information recording medium with the first beam for recording information in the medium and with the second and third beams for reproducing information recorded in the medium, the first, second, and third beams illuminating areas of recording medium in a recording direction in which information is recorded on the medium, and for extracting said plurality of beams of light reflected from said information recording medium; and
   optical detection means for detecting each of said first, second, and third beams after they have been extracted by said optical apparatus.

2. An optical information recording and reproducing apparatus according to claim 1 wherein said optical detection means comprises a first light-responsive device having four adjacent light-responsive surfaces disposed in a cross-shape for generating detection signals in response to the first beam, a second light-responsive device for generating detection signals in response to the second beam, and a third light-responsive device for generating detection signals in response to the third beam.

3. An optical information recording and reproducing apparatus according to claim 2 comprising a reproduction signal generating means for producing in response to detection signals generated by the second and third light-responsive devices a reproduction signal containing the information recorded on said information recording medium by the first beam.

4. An optical information recording and reproducing apparatus according to claim 3 wherein said reproduction signal generation means includes a divider for dividing one of the detection signal from said second and third light-responsive devices by the other detection signal.

* * * * *